United States Patent
Dahlman et al.

(10) Patent No.: US 11,284,418 B2
(45) Date of Patent: Mar. 22, 2022

(54) DETERMINING STARTING POSITIONS FOR UPLINK TRANSMISSIONS

(71) Applicant: Telefonaktiebolaget LM Ericsson (publ), Stockholm (SE)

(72) Inventors: Erik Dahlman, Stockholm (SE); Robert Baldemair, Solna (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 8 days.

(21) Appl. No.: 16/495,125

(22) PCT Filed: Mar. 26, 2018

(86) PCT No.: PCT/SE2018/050316
§ 371 (c)(1),
(2) Date: Sep. 18, 2019

(87) PCT Pub. No.: WO2018/174809
PCT Pub. Date: Sep. 27, 2018

(65) Prior Publication Data
US 2020/0351914 A1    Nov. 5, 2020

Related U.S. Application Data

(60) Provisional application No. 62/476,560, filed on Mar. 24, 2017, provisional application No. 62/480,086, filed on Mar. 31, 2017.

(51) Int. Cl.
*H04W 72/12* (2009.01)
*H04W 72/04* (2009.01)
*H04W 72/14* (2009.01)
*H04W 76/27* (2018.01)
*H04W 56/00* (2009.01)

(52) U.S. Cl.
CPC ..... *H04W 72/1268* (2013.01); *H04W 72/042* (2013.01); *H04W 72/0446* (2013.01); *H04W 72/14* (2013.01); *H04W 76/27* (2018.02)

(58) Field of Classification Search
CPC ............. H04W 72/1268; H04W 76/27; H04W 72/042; H04W 72/0446; H04W 72/14;
(Continued)

(56) References Cited

U.S. PATENT DOCUMENTS 10,868,659 B2   12/2020 Sahlin et al.
2014/0086112 A1   3/2014 Stern-Berkowitz et al.
(Continued)

FOREIGN PATENT DOCUMENTS

| JP | 2017502577 A | 1/2017 |
|---|---|---|
| RU | 2516449 C2 | 2/2014 |
| WO | 2011087416 A2 | 7/2011 |

OTHER PUBLICATIONS

3rd Generation Partnership Project, "3rd Generation Partnership Project; Technical Specification Group Radio Access Network; NR; Physical layer procedures for data (Release 15)", Technical Specification, 3GPP TS 38.214 V15.0.0, Feb. 1, 2018, pp. 1-76, 3GPP, France.

(Continued)

*Primary Examiner* — Inder P Mehra
(74) *Attorney, Agent, or Firm* — Coats + Bennett, PLLC

(57) ABSTRACT

The disclosure relates to a method (50), implemented at a radio network node, of determining a starting symbol for a scheduled uplink transmission by User Equipment, UE. The method comprises selecting (52) a starting symbol within an uplink slot for a scheduled uplink transmission by a UE; and identifying (54) the starting symbol to the UE.

22 Claims, 15 Drawing Sheets

(58) Field of Classification Search
CPC ......... H04W 72/1257; H04W 72/1278; H04W 56/0045
USPC ........................................................ 370/329
See application file for complete search history.

(56) References Cited

U.S. PATENT DOCUMENTS

| | | | |
|---|---|---|---|
| 2016/0330011 A1* | 11/2016 | Lee .......................... | H04L 5/006 |
| 2017/0041907 A1* | 2/2017 | Seo ..................... | H04L 27/2601 |
| 2017/0079060 A1 | 3/2017 | Keating et al. | |
| 2017/0171850 A1* | 6/2017 | Ang .................. | H04W 72/0406 |
| 2017/0289818 A1* | 10/2017 | Ng ......................... | H04L 5/0092 |
| 2018/0020441 A1* | 1/2018 | Lo ....................... | H04W 72/044 |
| 2018/0077702 A1* | 3/2018 | McLellan ............ | H04J 11/0086 |
| 2018/0359745 A1* | 12/2018 | Yeo ....................... | H04W 72/14 |
| 2019/0289635 A1* | 9/2019 | Wang ..................... | H04L 5/001 |
| 2020/0077433 A1* | 3/2020 | Lin ....................... | H04L 5/0053 |

OTHER PUBLICATIONS

Nokia et al., "On eLAA BS Demodulation Performance", 3GPP TSG-RAN WG4 Meeting #82, Athens, Greece, Feb. 13, 2017, pp. 1-4, R4-1701780, 3GPP.

3rd Generation Partnership Project, "3rd Generation Partnership Project; Technical Specification Group Radio Access Network; Evolved Universal Terrestrial Radio Access (E-UTRA); Multiplexing and Channel Coding (Release 14)", Technical Specification, 3GPP TS 36.212 V14.2.0, Mar. 1, 2017, pp. 1-197, 3GPP.

* cited by examiner

DETERMINING STARTING POSITIONS FOR UPLINK TRANSMISSIONS

TECHNICAL FIELD

The present disclosure relates generally to wireless communications, and in particular to a system and method of determining when, within an uplink time slot, a User Equipment (UE) should begin transmitting.

BACKGROUND

Wireless communication networks are ubiquitous in many parts of the world. Advances in state of the art in communication technology, increased power and sophistication of radio network devices such as User Equipment (UE), e.g., smartphones, and concomitant increases in the complexity and data exchange requirements of user applications, all require ever-increasing bandwidth and data rates in wireless networks implementations. The Third Generation Partnership Project (3GPP) develops and promulgates technical standards that define the protocols and requirements of wireless networks, ensuring interoperability geographically and between equipment makers. 3GPP has defined, and operators worldwide have deployed, a $4^{th}$ generation (4G) standard known as Long Term Evolution (LTE), defined in 3GPP Technical Specification Releases 8-13. LTE includes numerous provisions to address high-bandwidth requirements, such as wider carriers (up to 20 MHz), carrier aggregation (allowing up to 100 MHz of aggregated bandwidth), multiple-antenna techniques (such as beamforming, Multiple-Input-Multiple-Output (MIMO)), interference coordination (Inter-Cell Interference Coordination (ICIC), Coordinated Multi-Point (COMP)), and the like.

Current 3GPP standardization efforts relate to a $5^{th}$ generation (5G) standard, referred to as New Radio (NR). NR continues and expands LTE's support for higher bandwidth and data rates by defining operations above 6 GHz, and with even broader bandwidth component carriers. Simultaneously, NR provides support for low-cost, narrowband, high-reliability, low-power, high-coverage devices, sometimes referred to as Machine-to-Machine (M2M) communications, or the Internet of Things (IoT).

Frame Structure

The frame structure of NR transmissions comprises a number of slots. According to current agreements, the slots comprise either 7 or 14 consecutive Orthogonal Frequency Division Multiplex (OFDM) symbols for subcarrier spacing ≤60 kHz, or 14 OFDM symbols for subcarrier spacing >60 kHz. By way of example only, FIG. 1 shows a single NR slot with 14 OFDM symbols.

There are two types of slots—Uplink (UL) slots and Downlink (DL) slots. Downlink slots are transmitted by a Base Station (BS) in the network, for example, and are received by one or more UEs. Uplink slots, in contrast, are slots transmitted by a UE and received by a BS.

Numerologies

The operating frequency range for NR generally extends from sub-1 GHz to 100 GHz. To cover this wide range of carrier frequencies, NR supports different OFDM numerologies. At lower frequencies, NR utilizes narrower subcarrier spacing. OFDM symbols with narrow subcarrier spacing are long and have a long cyclic prefix (CP), which is important for deployment in large cells. However for small cells, and often at high frequencies, NR utilizes wider subcarrier spacing. Wide subcarrier spacing provides robustness towards phase noise and Doppler, which is important at high frequencies. Further, Orthogonal Frequency Division Multiplexing (OFDM) symbols with wide subcarrier spacing are short in time and have a short cyclic prefix (given the same overhead), which limits their use to small cells. OFDM numerologies with wide subcarrier spacing are typically used, for example, at high carrier frequencies due to phase noise robustness, or in low latency applications due to short symbol duration.

Table 1 below lists some different OFDM numerologies. As seen in this Table, the different numerologies include corresponding different OFDM symbol durations, normal cyclic prefix durations, symbol lengths including the cyclic prefixes, and slot lengths (assuming 14 symbols per slot). It should be readily appreciated by those of ordinary skill in the art that the numerologies seen in Table 1 are illustrative only, and that additional numerologies can be envisioned and are also possible.

TABLE 1

| Subcarrier spacing in kHz | OFDM symbol duration in μs | Cyclic prefix length in μs | Total symbol duration in μs | Slot length in μs |
|---|---|---|---|---|
| 15 | 66.67 | 4.69 | 71.35 | 1000 |
| 30 | 33.33 | 2.34 | 35.68 | 500 |
| 60 | 16.67 | 1.17 | 17.84 | 250 |
| 120 | 8.33 | 0.59 | 8.92 | 125 |

Uplink Transmission Timing and Time Alignment

The transmit timing of an uplink slot is given by a UE-specific offset relative to the timing, as observed by the UE, of a corresponding received downlink slot. The offset could be negative, which means that the uplink slot starts before the start of the corresponding downlink slot, or positive, which means that the uplink slot starts after the start of the corresponding downlink slot. FIG. 2, for example, illustrates an embodiment of a negative offset.

One possible reason for the offset for the uplink transmit timing, and why the offset may be different for different UEs, is that uplink slots transmitted from different UEs should, in some cases, preferably be aligned in time when they are received at the base station. In this case, UEs with larger propagation delay to the base station will have a larger negative offset (i.e., a somewhat earlier uplink transmission), while UEs with smaller propagation delay (e.g., UEs that are closer to the base station) will have a smaller negative offset (i.e., a somewhat later uplink transmission). For this reason, the process of setting the transmission offset is sometimes also referred to as "time alignment," a name that is sometimes used for the offset itself.

The offset for the UL transmit timing may be controlled by the network. Particularly, the network may send time-alignment commands to a UE. By way of example only, the time alignment commands could control the UE to increase or decrease the current offset by a certain amount. However, even though the network provides the time-alignment commands that determine the offset for the uplink transmit timing, the network may not know the exact offset used by the UE. This is because the UE may not always correctly detect the time-alignment commands transmitted by the network. When this happens, the UE will not update the offset. Thus, the offset may not always correspond to the offset expected by the network.

Time Division Duplex (TDD) Operation

To allow for time-division duplex (TDD)—i.e. downlink and uplink transmissions on the same carrier frequency—some of the OFDM symbols within a slot (either uplink or downlink) may not be transmitted. FIG. 3 illustrates this aspect. When this occurs, the corresponding time may instead be utilized for transmission in the opposite direction. Thus, if some OFDM symbols are not transmitted in the uplink direction, the time that would have been used to transmit those symbols could be utilized for transmissions in the downlink direction. Similarly, if some OFDM symbols are not transmitted in the downlink direction, the time that would have been used to transmit those symbols could be utilized for transmissions in the uplink direction.

Downlink Control Information and UL Scheduling

The first few symbols of a downlink slot may include downlink control information (DCI). These symbols are often referred to as the "control region," or the Physical Downlink Control Channel (PDCCH) region, of the downlink slot. FIG. 4 illustrates an embodiment of a 2-symbol control region. Within this region, the DCI may, for example, carry uplink scheduling grants informing the UE about time/frequency resources to use for subsequent uplink transmissions. However, even if a control region spans multiple OFDM symbols, an individual PDCCH may only span a single symbol, and therefore, could either be transmitted in the first or second symbol.

Additionally, as seen in FIGS. 5A-5B, there are different types of UL scheduling. FIG. 5A illustrates one type of scheduling referred to as "same-slot" scheduling. With same-slot scheduling, DCI transmitted within a DL $slot_n$ carries a scheduling grant for a corresponding uplink $slot_n$. Another type of scheduling, illustrated in FIG. 5B, is referred to as "later-slot" scheduling. As its name implies, "later-slot" scheduling involves the DCI transmitted within a downlink $slot_n$ carrying a scheduling grant for a later uplink $slot_{n+k}$, where k>0.

In some situations, an uplink transmission scheduled to occur in uplink $slot_m$ may not be able to utilize the entire time slot for the transmission, which can cause different issues for the different scheduling types.

For example, with "same-slot" scheduling, UL transmissions cannot begin before the scheduling grant has been received and properly decoded by the UE. Thus, the earliest possible starting position for the uplink transmission, within the uplink slot, may depend on several factors including, but not limited to:

The size of the downlink control region;
The position of the DCI (i.e., the scheduling grant) within the control region;
The time needed by the UE to decode the scheduling grant (note that the time can be different for different numerologies if the time is normalized to the OFDM symbol duration); and
The offset from the start of the UL slot, relative to the start of the corresponding downlink slot (i.e., the time alignment value).

With "later-slot" scheduling, the scheduling grant is typically received and decoded by the UE well before the start of the uplink slot for which the scheduling grant is valid. However, the UE may still not be able to use the entire uplink slot for the scheduled uplink transmission.

For example, the UE may still have to receive possible DCI in the downlink control region overlapping the uplink slot in which the uplink scheduled transmission is to occur. However, in a TDD system with uplink and downlink transmission on the same frequency, the UE is not able to begin transmitting on the uplink until it has received the control region. Even in situations where the UE does not need to receive the downlink control region overlapping the uplink slot in which the uplink scheduled transmission is to occur, the UE may still have to avoid transmission in the part of the uplink slot that overlaps the received control region. This is because the UE transmissions may interfere with other nearby devices that have to receive the downlink information.

Finally, in situations where there is no received downlink control region overlapping with the uplink slot in which the uplink scheduled transmission is to occur, part of the uplink slot may overlap with downlink transmissions in the previous downlink slot. However, to avoid interference between uplink and downlink transmissions, the uplink transmission cannot begin until the received downlink transmission has ended. Further, to avoid UE-to-UE interference, DL reception should have preferably ended for all UEs in the cell.

Regardless of whether the scheduling is same-slot uplink scheduling or later-slot uplink scheduling, however, the starting position of a scheduled uplink transmission, within an uplink slot, may depend on several factors. These factors include, but are not limited to:

The endpoint of any previous downlink transmission. Such previous downlink transmissions may, for example, correspond to downlink transmissions in the previous downlink slot or DCI in the control region of the current downlink slot (i.e., the downlink slot that corresponds to the uplink slot in which the scheduled uplink transmission is to occur);
The position of the DCI within the control region;
The time needed by the UE to decode the scheduling grant; and
The offset from the start of the uplink slot, relative to the start of the corresponding downlink slot (i.e., the time alignment value).

Several of these parameters are known to both the network and the UE. However, this is not always true. For example, due to the unavoidable presence of errors in the detection of time-alignment commands, the network and the UE may not have the same understanding of the exact time-alignment offset. Additionally, or alternatively, the UE and network may not share the same understanding of the time needed by the UE to decode the scheduling grant.

Accordingly, one challenge is to provide a UE with a well-defined process that allows the UE to properly determine a position, within a UL slot, to begin a scheduled UL transmission. Another challenge is to provide the network with the capability to determine when the UL transmission will begin within the UL slot. Such information would allow for the proper detection and demodulation of uplink transmissions.

The Background section of this document is provided to place embodiments of the present disclosure in technological and operational context, thereby assisting those of ordinary skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

According to one or more embodiments described and claimed herein, starting positions or symbols are determined for scheduled uplink transmissions made by User Equipment (UE).

In one embodiment, a method, implemented at a User Equipment (UE), of determining when, within an uplink slot, the UE is to begin an uplink transmission is provided. In this embodiment, the method comprises the UE receiving, from a radio network node, a message identifying a starting symbol within the uplink slot for the scheduled uplink transmission, and transmitting the scheduled uplink transmission to the radio network node from the starting symbol.

In one embodiment, the message identifying the starting symbol within the uplink slot for the scheduled uplink transmission comprises one of a scheduling grant transmitted to the UE and a Radio Resource Control (RRC) signaling message.

In one embodiment, receiving, from a radio network node, a message identifying a starting symbol within the uplink slot for the scheduled uplink transmission comprises receiving a symbol start position together with a slot assignment.

In another embodiment, however, receiving, from a radio network node, a message identifying a starting symbol within the uplink slot for the scheduled uplink transmission comprises receiving a symbol start position separately from a slot assignment.

In embodiments where the symbol start position is received separately from the slot assignment, the slot assignment is received in a control message, and the symbol start position is RRC configured.

Another embodiment of the disclosure provides a User Equipment (UE) comprising a transceiver and processing circuitry operatively connected to the transceiver. The transceiver is configured to communicate data with a radio network node in a communications network, and the processing circuitry is configured to receive, from a radio network node, a message identifying a starting symbol within the uplink slot for the scheduled uplink transmission, and transmit the scheduled uplink transmission to the radio network node from the starting symbol.

In one embodiment, the message identifying the starting symbol within the uplink slot for the scheduled uplink transmission comprises one of a scheduling grant transmitted to the UE, and a Radio Resource Control (RRC) signaling message.

In one embodiment, the starting symbol comprises a symbol start position and a slot assignment, and the processing circuitry is configured to receive the symbol start position together with the slot assignment.

In another embodiment, however, the processing circuitry is configured to receive the symbol start symbol separately from the slot assignment.

In such embodiments, the processing circuitry is configured to receive the slot assignment in a control message, and the symbol start position is RRC configured.

According to one embodiment of the present disclosure, a method, implemented at a radio network node, of determining a starting symbol for a scheduled uplink transmission by User Equipment (UE) is provided. In this embodiment, the method comprises the radio network node selecting a starting symbol within an uplink slot for a scheduled uplink transmission by a UE, and identifying the starting symbol to the UE.

In one embodiment, selecting the starting symbol within an uplink slot comprises selecting the starting symbol based on at least one of a length of a downlink (DL) control region, a position of PDCCH within a DL control region, a processing time needed by the UE to decode Downlink Control Information (DCI), and to prepare the scheduled uplink transmission based on the decoded DCI, and an amount of time alignment provided to the UE.

In one embodiment, the method further comprises determining the processing time needed by the UE. In this embodiment, determining the processing time comprises adjusting the processing time based on a characteristic of one or more of a Physical Uplink Shared Channel (PUSCH), Physical Downlink Shared Channel (PDSCH), and a Physical Downlink Control Channel (PDCCH) depending on an Orthogonal Frequency Division Multiplex (OFDM) symbol duration.

In one embodiment, identifying the starting symbol to the UE comprises identifying the starting symbol in one of a scheduling grant transmitted to the UE, and a Radio Resource Control (RRC) signaling message transmitted to the UE.

In another embodiment, identifying the starting symbol to the UE comprises identifying the starting symbol along with a time-alignment command transmitted to the UE.

In one embodiment, the method further comprises identifying a slot assignment for the starting symbol to the UE.

In one embodiment, the method further comprises identifying the starting symbol to the UE together with the slot assignment.

In one embodiment, the method further comprises identifying the starting symbol to the UE separately from the slot assignment.

In embodiments where the starting symbol is identified separately from the slot assignment, the method comprises identifying the slot assignment in the DCI transmitted to the UE, and identifying the starting symbol in an RRC signaling message transmitted to the UE.

In one embodiment, identifying the starting symbol to the UE comprises identifying a nominal starting position within the uplink slot to the UE.

In one embodiment, identifying the starting symbol to the UE comprises identifying a starting position within the uplink slot based on one or more of a predetermined control region size, a predetermined PDCCH position, and a predetermined end position associated with a previous downlink transmission, wherein the predetermined end position defines one of a downlink slot that corresponds to the uplink slot and a downlink slot that occurs prior to the uplink slot.

In one embodiment, the uplink slot is comprised in a first part of a slot, and a second part of the slot comprises a downlink slot.

According to one embodiment of the present disclosure, a radio network node is provided comprising a transceiver and processing circuitry operatively connected to the transceiver. The transceiver configured to communicate data with a User Equipment (UE), and the processing circuitry is configured to select a starting symbol within an uplink slot for a scheduled uplink transmission by a UE, and identify the starting symbol to the UE via the transceiver.

In one embodiment, the processing circuitry is configured to select the starting symbol based on at least one of a length of a downlink (DL) control region, a position of PDCCH within the DL control region, a processing time needed by the UE to decode Downlink Control Information (DCI), and to prepare the scheduled uplink transmission based on the decoded DCI, and an amount of time alignment applied by the UE.

In one embodiment, the processing circuitry is configured to determine the processing time needed by the UE by adjusting the processing time based on a characteristic of one or more of a Physical Uplink Shared Channel (PUSCH), a Physical Downlink Shared Channel (PDSCH), and a Physical Downlink Control Channel (PDCCH) depending on an Orthogonal Frequency Division Multiplex (OFDM) symbol duration.

In one embodiment, the processing circuitry is configured to identify the starting symbol in at least one of a scheduling grant transmitted to the UE, and a Radio Resource Control (RRC) signaling message transmitted to the UE.

In one embodiment, the processing circuitry is configured to identify the starting symbol along with a time-alignment command transmitted to the UE.

In one embodiment, the processing circuitry is further configured to identify a slot assignment for the starting symbol to the UE.

In one embodiment, the processing circuitry is configured to identify the starting symbol together with the slot assignment.

In one embodiment, the processing circuitry is configured to identify the starting symbol separately from the slot assignment.

In one embodiment, to identify the starting symbol separately from the slot assignment, the processing circuitry is configured to identify the slot assignment in the DCI transmitted to the UE, and identify the starting symbol in an RRC signaling message transmitted to the UE.

In one embodiment, the processing circuitry is configured to identify an actual starting position within the uplink slot to the UE.

In one embodiment, the processing circuitry is configured to identify a starting position for the UE to use based on one or more of a predetermined control region size, a predetermined PDCCH position, and a predetermined end position associated with a previous downlink transmission, wherein the predetermined end position defines one of a downlink slot that corresponds to the uplink slot and a downlink slot that occurs prior to the uplink slot.

In one embodiment, the uplink slot is comprised in a first part of a slot, and a second part of the slot comprises a downlink slot.

BRIEF DESCRIPTION OF THE DRAWINGS

The present disclosure will now be described more fully hereinafter with reference to the accompanying drawings, in which embodiments of the present disclosure are shown. However, these embodiments should not be construed as limited to those set forth herein. Rather, these embodiments are provided so that this disclosure will be thorough and complete, and will fully convey the scope of the present disclosure to those skilled in the art.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

Embodiments of the present disclosure relate to determining a starting position or symbol, within an uplink slot, for a scheduled uplink transmission to be made by a UE to a radio network node or device, such as a base station, for example. So determined, the UE can transmit the scheduled uplink transmission to the radio network node from the starting symbol.

Figure 1:
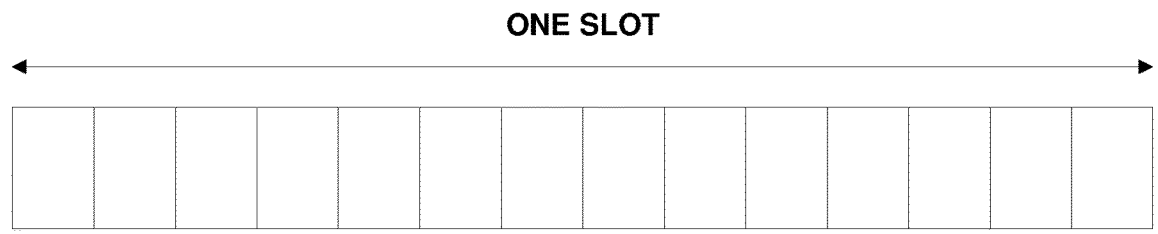
FIG. 1 illustrates an example of a 14-symbol New Radio (NR) slot according to one embodiment.
Figure 2:
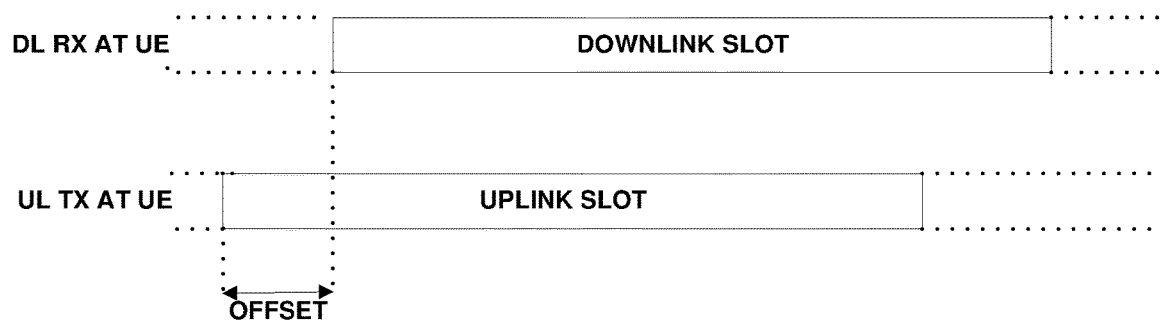
FIG. 2 illustrates uplink transmit timing in which an uplink slot has a negative transmission offset relative to a downlink slot according to one embodiment.
Figure 3:
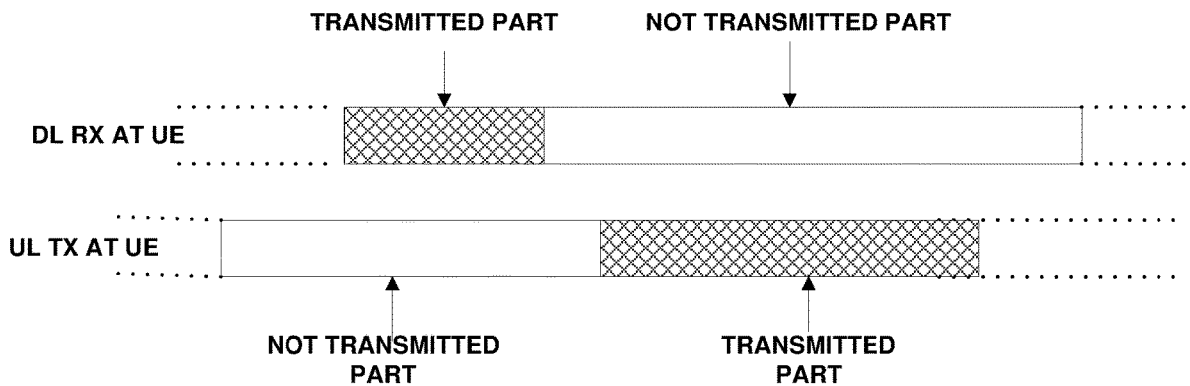
FIG. 3 illustrates transmitted and non-transmitted parts in both an uplink slot and a downlink slot associated with Time-Division Duplex (TDD) operation according to one embodiment.
Figure 4:
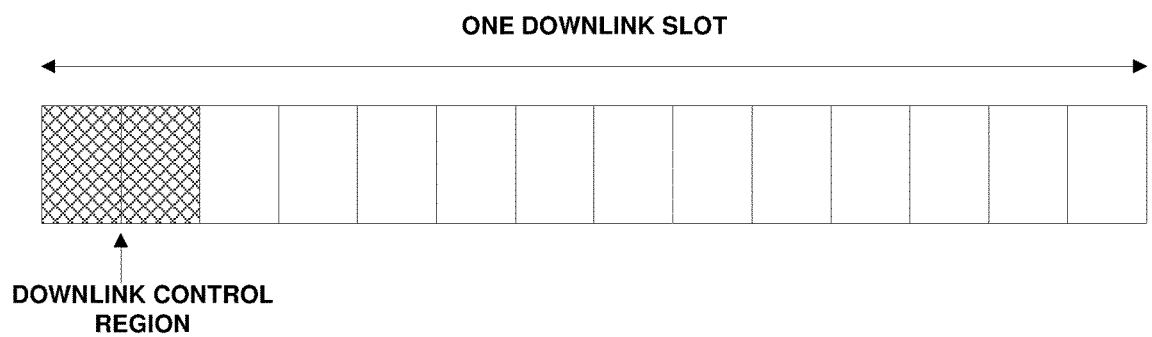
FIG. 4 illustrates a downlink control region in a NR downlink slot according to one embodiment.
Figure 5A:
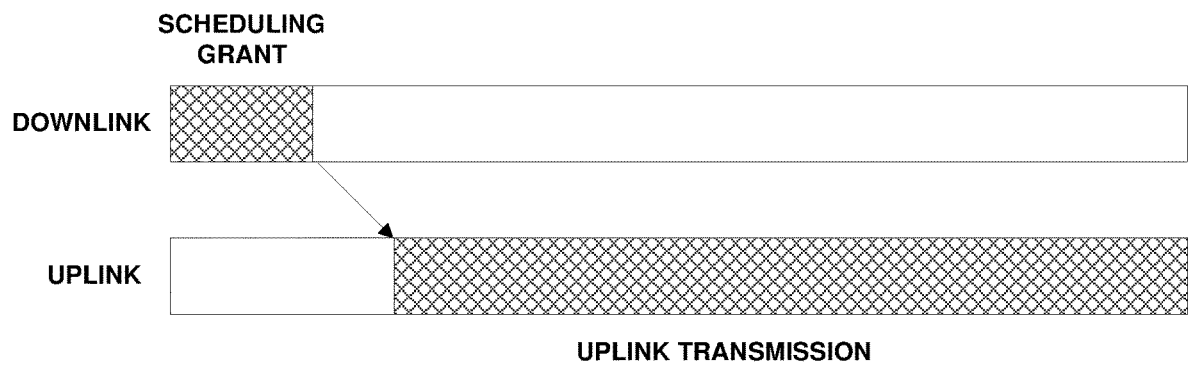
FIGS. 5A-5B illustrate same-slot scheduling and later-slot scheduling, respectively, according to one embodiment.
Figure 5B:
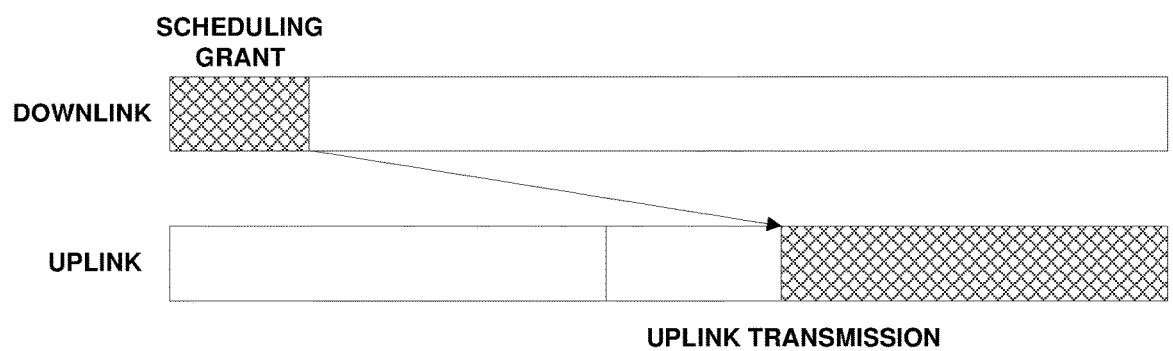
Figure 6:
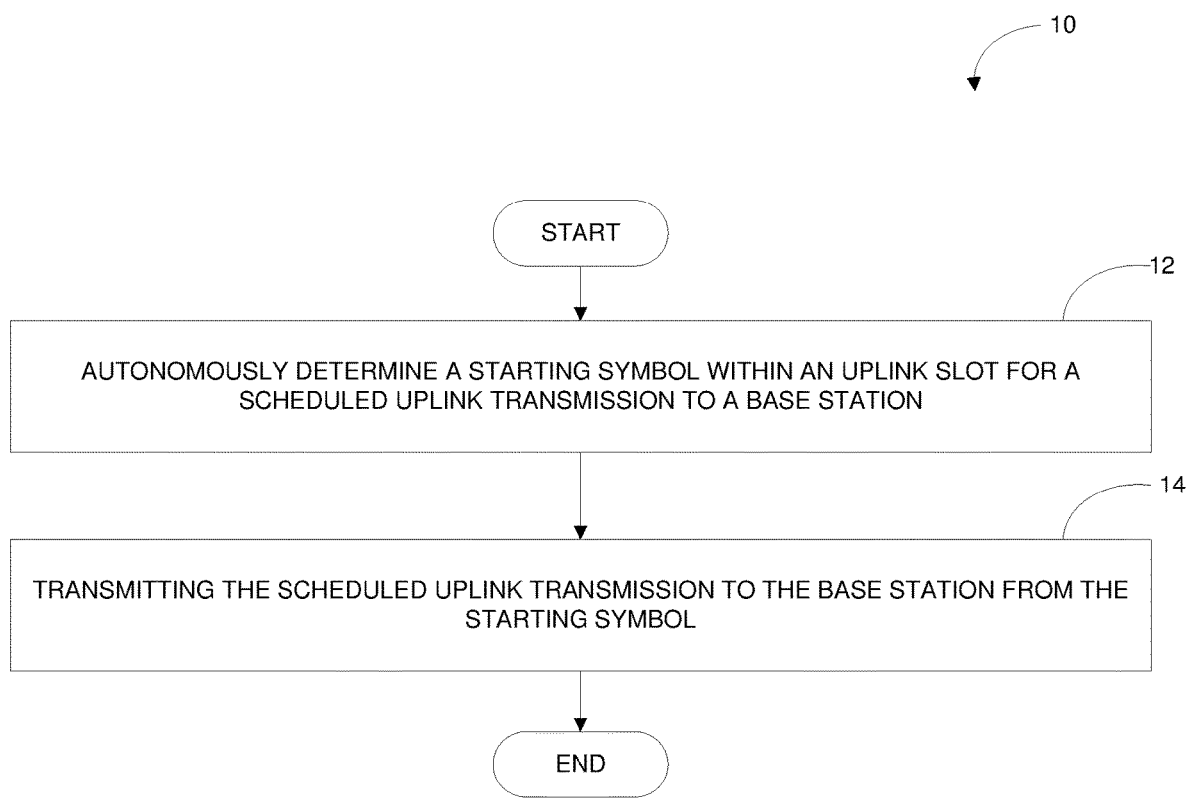
FIG. 6 is a flow diagram illustrating a method, implemented at a UE, of determining a starting symbol within an uplink slot according to one embodiment.

There are various methods for determining the starting position. For example, one embodiment, seen in FIG. 6, provides a method 10 by which the UE autonomously determines the starting symbol. As seen in FIG. 6, the UE first autonomously determines a starting symbol within an uplink slot for a scheduled uplink transmission to a base station (box 12). So determined, the UE transmits the scheduled uplink transmission to the base station from the starting symbol (box 14).

In some embodiments, the uplink slot comprises a first part or "uplink part" of a slot, and carries symbols that are used or reserved for uplink transmissions from the UE to a radio network node. In such embodiments, the slot may also comprise a second part or "downlink part" that carries symbols used or reserved for downlink transmissions from the radio network node to the UE. In other embodiments, however, the entire slot (i.e., all 7 or 14 consecutive OFDM symbols) may be utilized for communicating symbols on either the uplink or the downlink. In these cases, the entire slot would comprise either an uplink slot or a downlink slot.

The present embodiments configure the UE to autonomously determine the starting symbol for the scheduled uplink transmission considering various different parameters. Such parameters may include, but are not limited to, the following:

The endpoint of any previous downlink transmission. This may correspond, for example, to downlink transmissions in a previous downlink slot, or to DCI in the control region, or to a control region length of the current downlink slot—i.e., the downlink slot corresponding to the uplink slot in which the scheduled uplink transmission is to take place;

The position of the DCI within the downlink control region;

The processing time needed to decode the DCI and prepare the uplink transmission based on the decoded DCI (this time—if normalized to the OFDM symbol duration—can be different for different numerologies. That is, different numerologies, such as OFDM numerology of the Physical Downlink Shared Channel (PDSCH) and/or the Physical Downlink Control Channel (PDCCH), and/or the Physical Uplink Shared Channel (PUSCH), for example, can also have an impact); and The absolute amount of time alignment applied at the UE side.

In some instances, there could be a misunderstanding between the network and the UE in terms of the starting symbol. To handle such misunderstandings, the network may try to demodulate and decode the uplink Physical Uplink Shared Channel (PUSCH) transmission assuming different starting symbols.

In more detail, although the network knows the length of the downlink control region and the position of the DCI within the control region, the network and the UE may not have the same understanding of starting symbol. That is, the network and the UE may not have the same understanding of when, within the uplink slot, the UE starts transmission. The reason could be due, as mentioned above, to incorrectly received time alignment commands. More particularly, due to such incorrectly received commands, the network and the UE may not have the same understanding of the absolute amount of time-alignment applied at the UE side. Moreover, the UE and the network may not necessarily have the same understanding of the processing time needed by the UE to decode the DCI and prepare the uplink transmission.

To handle such situations, one embodiment configures the network to try and demodulate and decode the uplink PUSCH transmission assuming different starting symbols. Once decoded, the network will verify the decoded transmission by determining whether the transmission was decoded correctly. Provided the network determines that the transmission was properly decoded, the network can identify the starting symbol as being the currently selected starting symbol.

The present embodiments are able to verify whether a transmission has been decoded correctly in different ways. For example, a linear error correcting code, such as a Low-Density Parity-Check (LDPC) code, may be utilized as such codes are capable of verifying whether a decoded transmission is correct. However, in one embodiment, verification is based on a cyclic-redundancy check (CRC). Specifically, upon decoding the transmission, the network determines a CRC value for the decoded transmission and compares that value to a corresponding CRC value that is included in the uplink transmission. Based on the results of the comparison, the network may subsequently be able to detect which starting symbol is the correct starting symbol. In particular, if the CRC values match, the network may determine that the symbol selected as the starting symbol for decoding the transmission is the starting symbol. If the CRC values do not match, however, the network may determine that the symbol selected as the starting symbol for decoding the transmission is not the starting symbol. In these latter cases, the network may repeat decoding the transmission using a different symbol. Often, a transport block is segmented into multiple code blocks. Therefore, in some embodiments, it is sufficient to try to demodulate the earliest code block under different starting symbol hypothesis.

Figure 7:
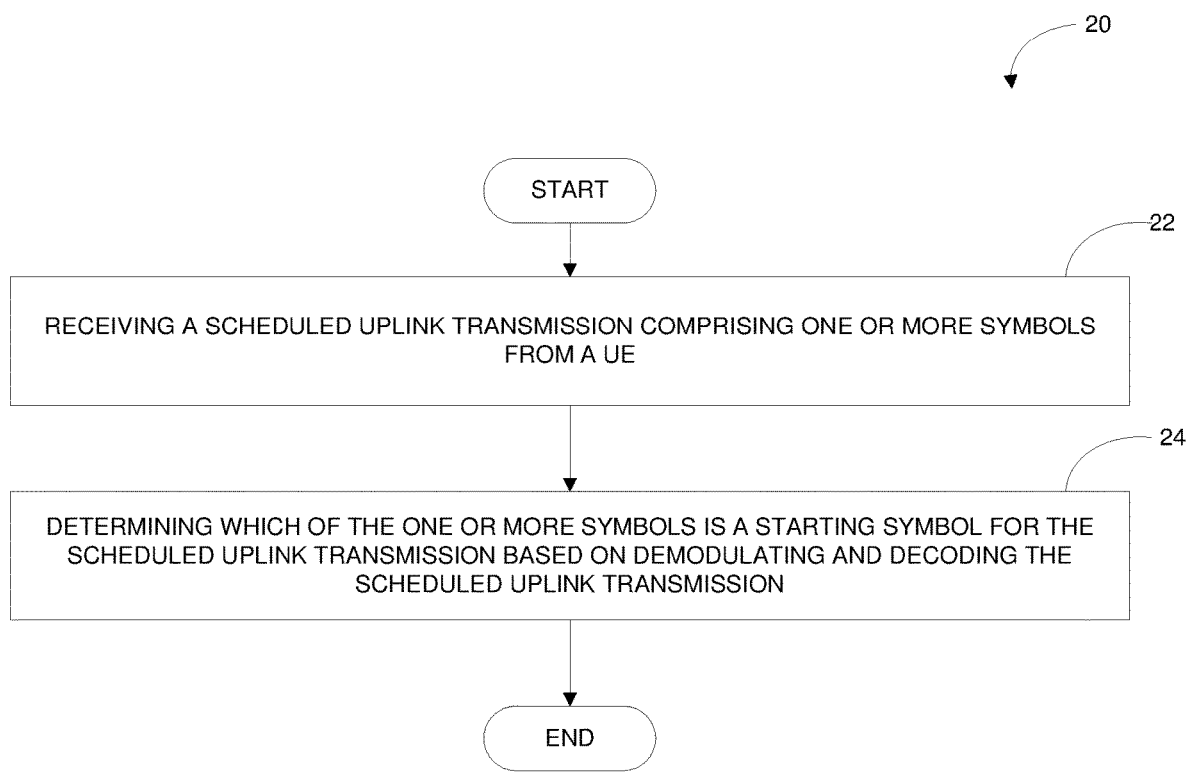
FIG. 7 is a flow diagram illustrating a method, implemented at a radio network node, of determining a starting symbol within an uplink slot according to one embodiment.

FIG. 7 is a flow diagram illustrating this aspect of the present disclosure according to one embodiment. More particularly, as seen in FIG. 7, a method 20 begins with a radio network node (e.g., a base station) receiving a scheduled uplink transmission from the UE (box 22). The scheduled uplink transmission comprises one or more symbols. Once received, the radio network node determines which of the one or more symbols is a starting symbol for the scheduled uplink transmission by demodulating and decoding the scheduled transmission (box 24).

Figure 8:
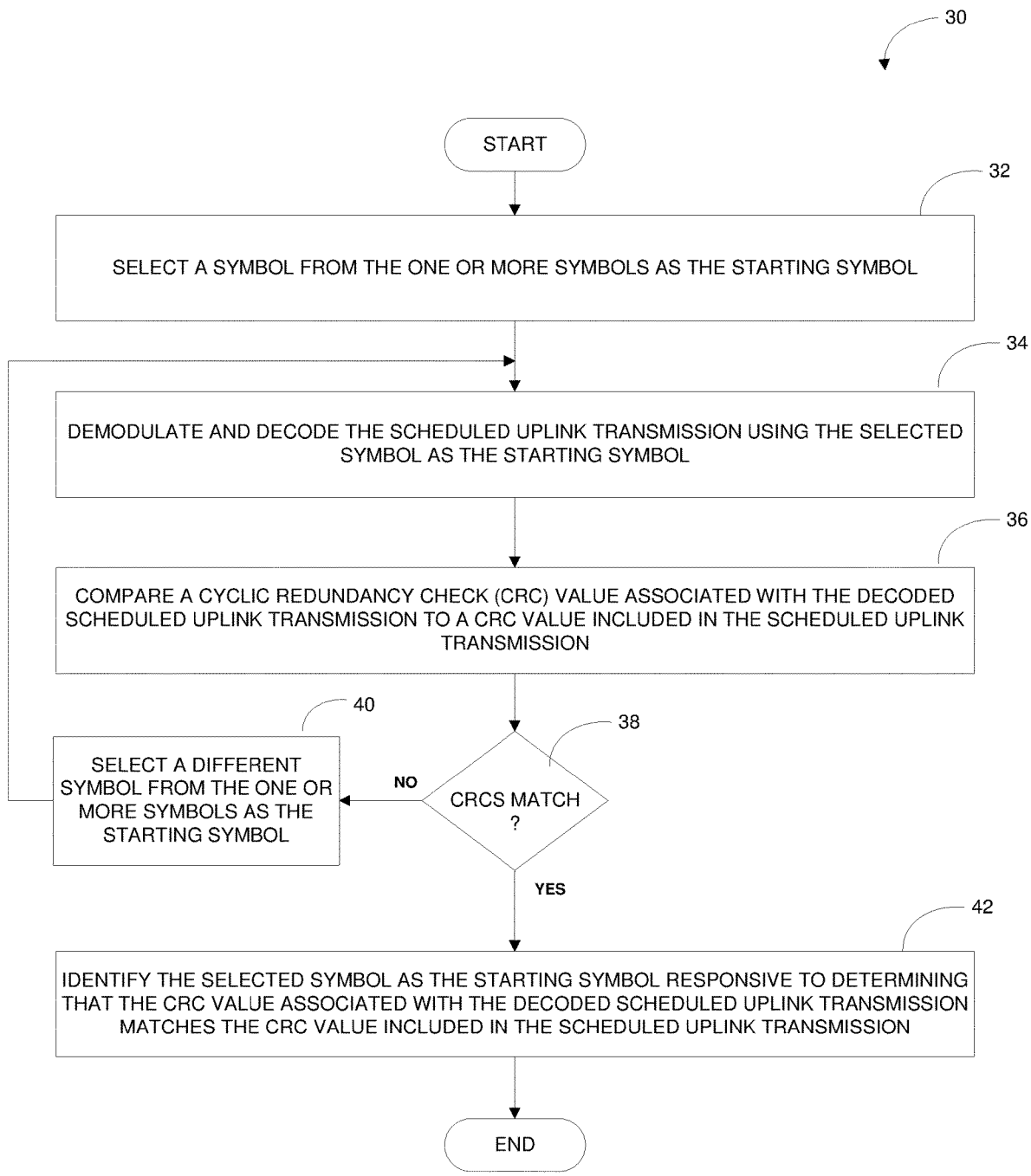
FIG. 8 is a flow diagram illustrating a method, implemented at a radio network node, of determining a starting symbol within an uplink slot according to another embodiment.

FIG. 8 is a flow diagram illustrating a method 30 for determining the starting symbol at the radio network node in more detail. Method 30 begins with the radio network node selecting a symbol from the one or more symbols received with the scheduled uplink transmission (box 32). The selected symbol, which may be arbitrarily selected, for example, is then assumed to be the starting symbol. The radio network node then demodulates and decodes the scheduled uplink transmission using the selected symbol as the starting symbol (box 34). The radio network node then compares a Cyclic Redundancy Check (CRC) value associated with the decoded scheduled uplink transmission to a corresponding CRC value received in the scheduled uplink transmission (box 36). If the CRC values do not match (box 38), the radio network node selects another different symbol as the starting symbol (box 40), and repeats the demodulation/decoding and CRC comparison steps. Otherwise, provided the CRCs match (box 38), the radio network node identifies the selected symbol as the starting symbol (box 42).

Figure 9A:
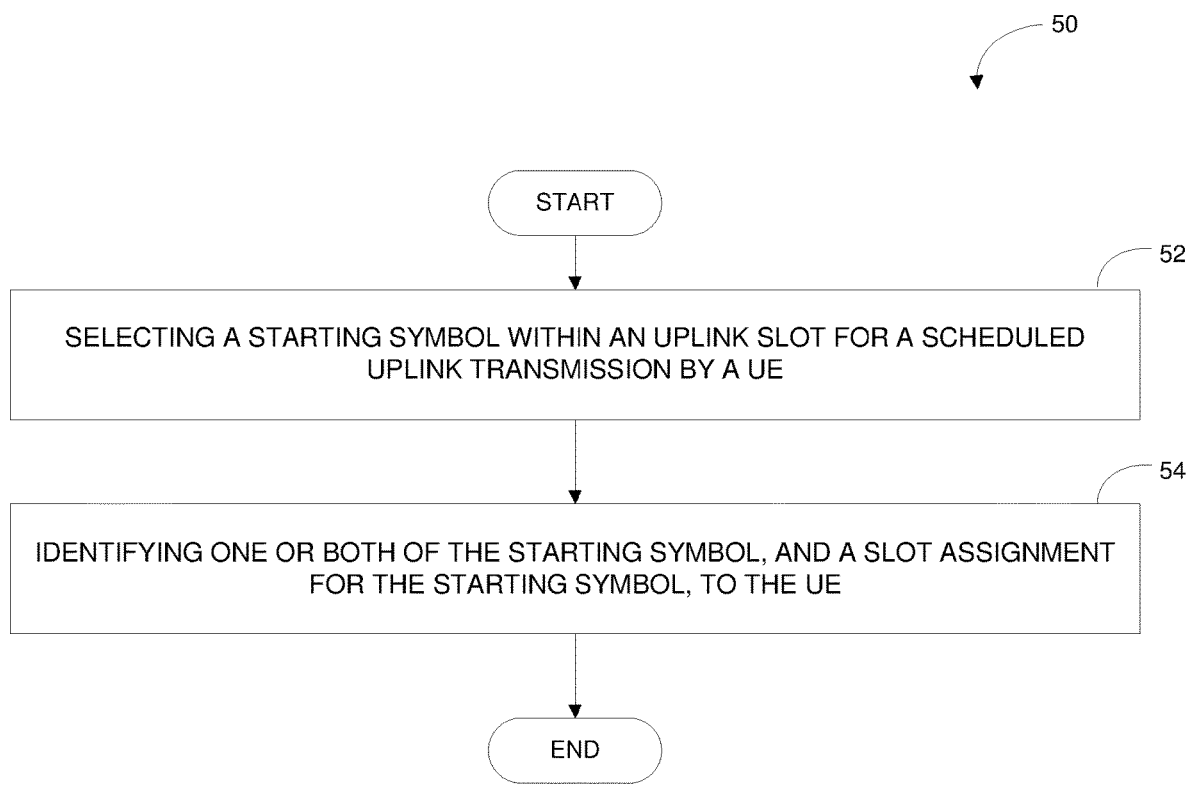
FIG. 9A is a flow diagram illustrating a method, implemented at a radio network node, of determining a starting symbol within an uplink slot and identifying the starting symbol to a UE according to one embodiment.

In another method 50 for determining the starting position, seen in FIG. 9A, the network determines the starting symbol within the uplink slot, and signals that starting symbol to the UE. So informed, the UE will know at which starting symbol within the uplink slot transmission should start.

As seen in FIG. 9A, the radio network node selects a starting symbol within an uplink slot for a scheduled uplink transmission by a UE (box 52), and identifies one or both of the starting symbol, and a slot assignment for the starting symbol, to the UE (box 54).

Figure 9B:
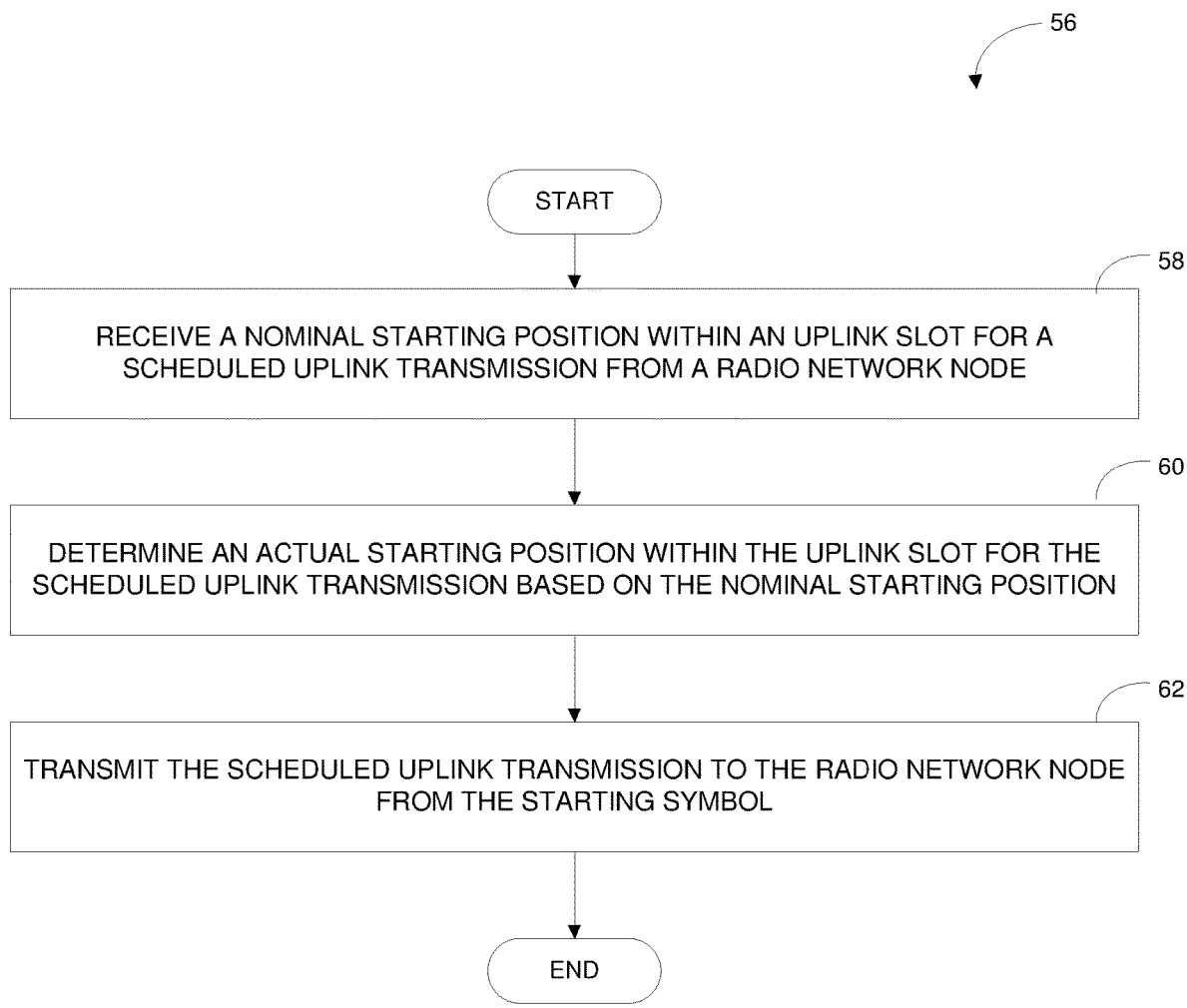
FIG. 9B is a flow diagram illustrating a method, implemented at a UE, of determining a starting symbol within an uplink slot based on information received from a radio network node according to one embodiment.
Figure 9C:
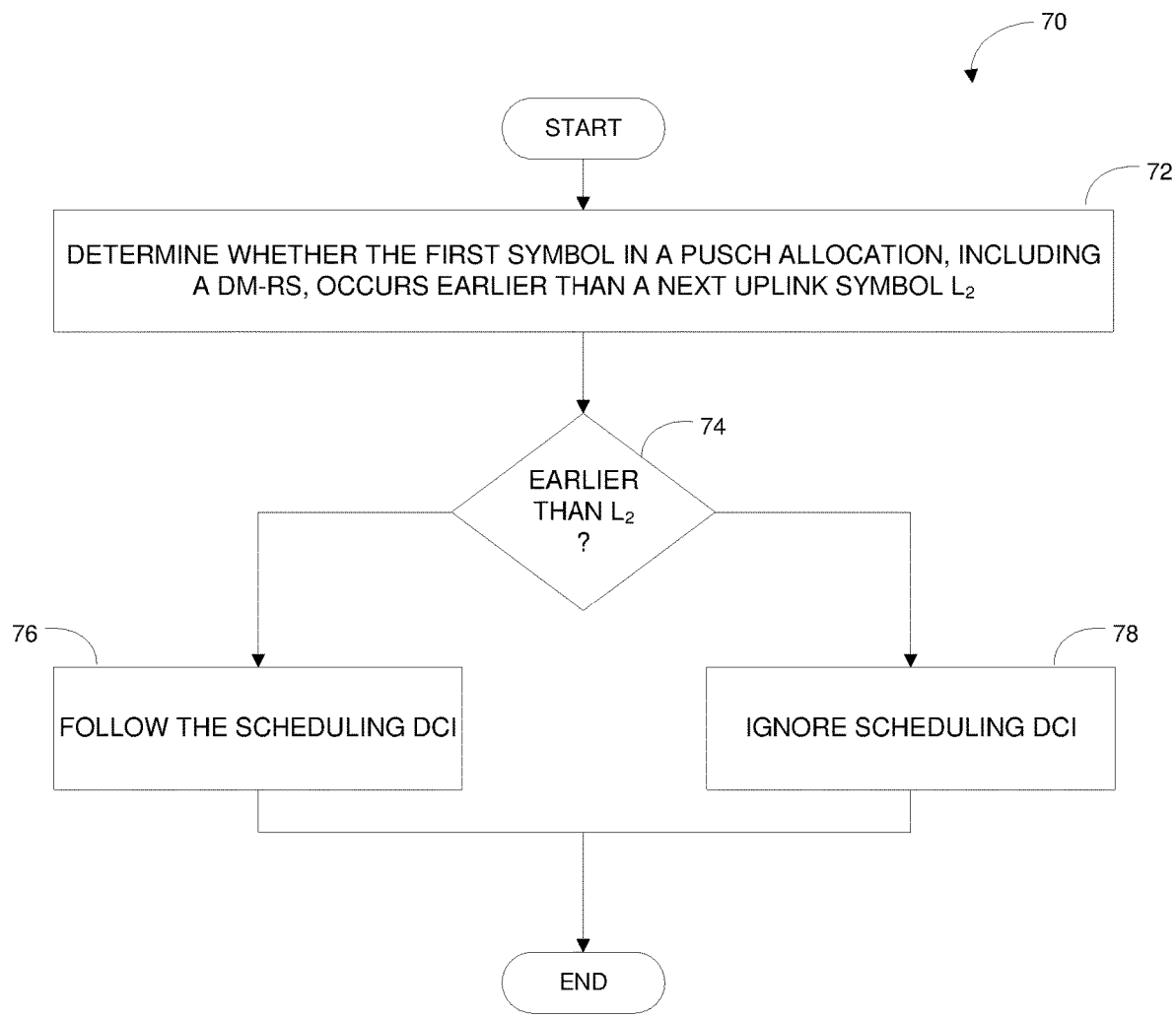
FIG. 9C is a flow diagram illustrating a method, implemented at a radio network node, of determining whether the first symbol in a PUSCH allocation occurs earlier than a next uplink symbol.
Figure 9D:
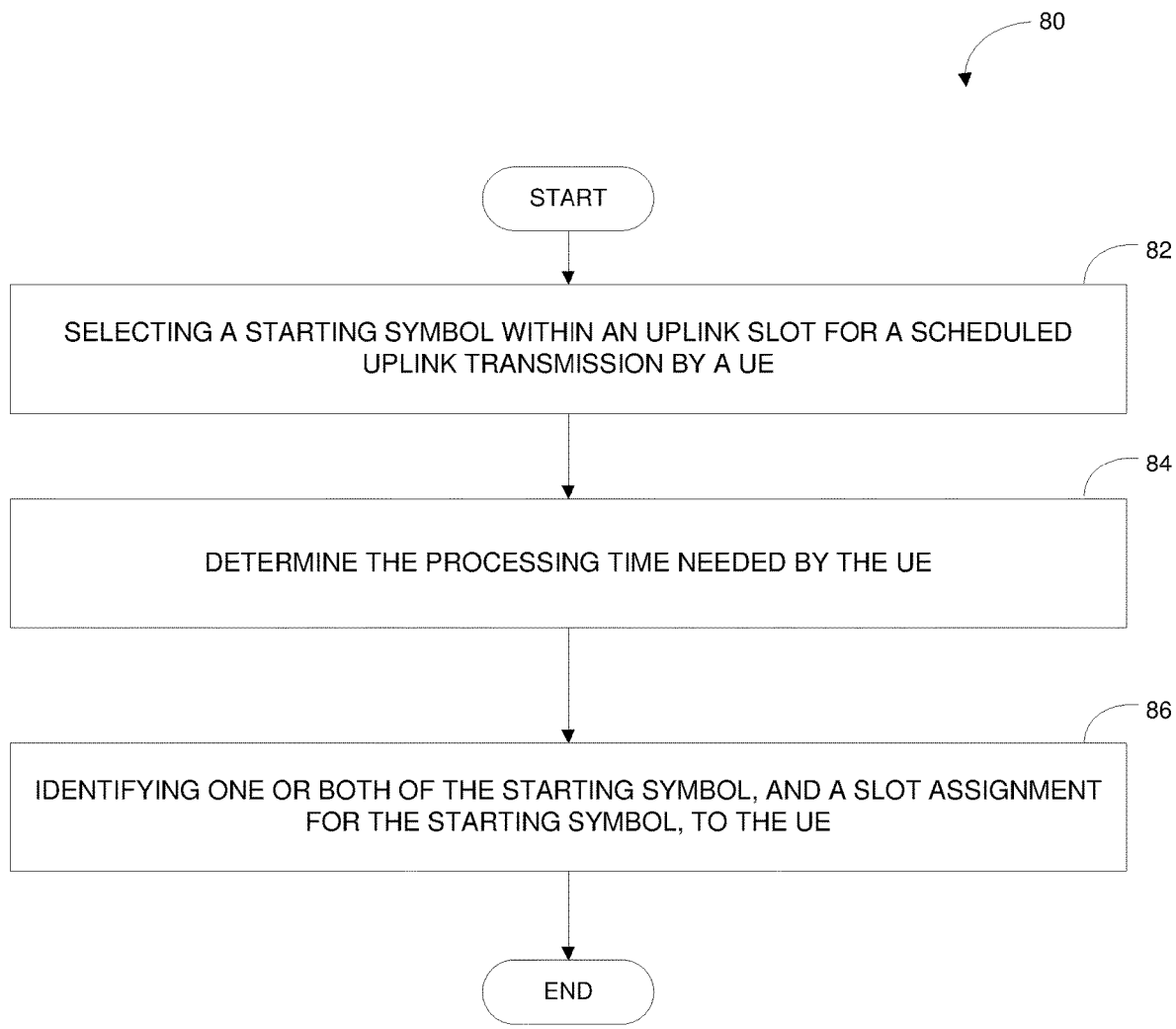
FIG. 9D is a flow diagram illustrating a method, implemented at a radio network node, of determining a starting symbol within an uplink slot and identifying the starting symbol to a UE according to one embodiment.

FIG. 9D illustrates another method 80 for determining the starting symbol and signaling that starting symbol to the UE. In more detail, the radio network node may in some embodiments select a starting symbol within an uplink slot for a scheduled uplink transmission by a UE (box 82), determine the processing time needed by the UE (box 84), and then identify one or both of the starting symbol, and a slot assignment for the starting symbol, to the UE (box 86).

As above, there are various parameters the network could consider in order to determine or select the starting symbol for the UE. These parameters include, but are not limited to, the following:

The length of the downlink control region;

The position of the DCI within the control region;

The network understanding of the processing time needed by the UE to decode the DCI and prepare the uplink transmission based on the decoded DCI (this time—if normalized to the OFDM symbol duration—can be different for different numerologies. That is, different numerologies, such as OFDM numerology of PDSCH and/or PDCCH, and/or the PUSCH, for example, can also have an impact); and The network understanding of the absolute amount of time alignment applied at the UE side.

The selection of the starting symbol by the network would typically include a margin to ensure that the UE would have sufficient time to receive and process the DCI, as well as prepare the uplink transmission, even though the network understanding of the absolute time alignment applied at the UE and the required processing time at the UE may not be completely accurate.

Further, there are various ways in which to signal the starting symbol to the UE. For example, signaling of the starting point could be included in the scheduling grant. Alternatively, signaling of the starting point could be implemented using a slower means of delivery—e.g. Radio Resource Control (RRC) signaling. Signaling could, for example, take place each time the network provides a time-alignment command to the UE, or signaling could take place less often. Additionally, the signaling for which slot an assignment is valid for could either be signaled together with the symbol start position or separately from the symbol start position. For example, the slot assignment could be signaled in the DCI while the symbol start position is RRC configured. Alternatively, both the slot assignment and the symbol start position could be signaled in the DCI. In one embodiment, the DCI comprises a field 'X' and the starting symbol is a function of 'X'. That is, in one embodiment, the starting symbol is f(X).

In one embodiment, the network signaling of a starting position or symbol within the uplink slot could indicate the actual starting position within the uplink slot. Alternatively, as seen in method 56 of FIG. 9B, however, the network could indicate a nominal starting position within the uplink slot that the UE should use. The nominal starting position may be determined assuming a nominal control region size and/or a nominal DCI position and/or a nominal end position of previous DL transmission (i.e., either transmission in same slot or DL transmission in previous slot). Upon the UE receiving the nominal starting position within the uplink slot for the scheduled uplink transmission (box 58), the actual starting position within the uplink slot to use by the UE should be determined based on the nominal starting position (box 60). Then, the UE can transmit the scheduled uplink transmission to the radio network node from the starting symbol (box 62).

In one embodiment, the actual starting position within the uplink slot may be determined depending on the size of the PDCCH region, assuming this can be dynamically varying, and/or the actual DCI position within the PDCCH region or the end of the previous DL transmission. For example, in one embodiment, the nominal starting position within the uplink slot is signaled to the UE in a scheduling grant over the downlink. Upon receiving the grant, the UE is able to determine one or more of an actual or predetermined end position for the downlink transmission, an actual or predetermined position for the DCI, and an actual or predetermined end position for the control region. So informed the UE may then determine the actual start position based on the nominal start positon, at least one of other nominal values, and at least one of the actual or predetermined values. Thus, using the end position of a downlink transmission as an example only, the UE may determine an actual starting position for the scheduled uplink transmission using the following formula:

$$\text{StartPos}_{ACTUAL} = \text{StartPos}_{NOMINAL} + \text{DL EndPos}_{ACTUAL} - \text{DL EndPos}_{NOMINAL} \quad (1)$$

where:

$\text{StartPos}_{ACTUAL}$ is the actual starting position for the scheduled uplink transmission computed by the UE;

$\text{StartPos}_{NOMINAL}$ is the nominal starting position provided to the UE by the radio network node;

$\text{DL EndPos}_{ACTUAL}$ is the actual or predetermined end position for the downlink transmission; and $\text{DL EndPos}_{NOMINAL}$ is the nominal end position for the downlink transmission.

In situations where $\text{DL End Pos}_{ACTUAL}$ and $\text{DL End Pos}_{NOMINAL}$ are the same, then the actual start position ($\text{Start Pos}_{ACTUAL}$) and the nominal start position ($\text{Start Pos}_{NOMINAL}$) are also the same. If, however, if $\text{DL End Pos}_{ACTUAL}$ occurs later than $\text{DL End Pos}_{NOMINAL}$, then the actual start positon ($\text{Start Pos}_{ACTUAL}$) will be delayed.

It should be noted that the use of the downlink end position—both actual and nominal—in equation (1) above is for illustrative purposes only. Those of ordinary skill in the art should appreciate that parameters representing both the actual and nominal DCI positions, and control region end positions, may be utilized in equation (1).

In another embodiment, shown in FIG. 9C, the actual starting position within the uplink slot may be determined considering the UE PUSCH preparation procedure time. As seen in method 70, this is based on the time between the end of the PDCCH and the start of the PUSCH and is the minimum amount of time required by the UE for processing. Particularly, Method 70 begins by determining whether the first symbol in the PUSCH allocation, including a Demodulation Reference Signal (DM-RS), occurs earlier than a symbol $L_2$ (box 72). If the first symbol in the PUSCH allocation occurs no earlier than symbol $L_2$ (box 74), the UE follows the scheduling DCI (box 76). Otherwise, the UE can ignore the scheduling DCI (box 78).

In this embodiment, symbol $L_2$ is measured directly at the UE and is defined as the next uplink symbol with its CP starting at:

$$((N_2+d_2)(SD_{CHIPS}+CP_{LENGTH})C_{SCS})T_C \text{ seconds}$$

after the last symbol of the PDCCH carrying the DCI scheduling the PUSCH, where:

$N_2$ is based on the capabilities of the UE, and defines the PUSCH preparation time in symbols according to one of the following tables, where identifies the numerology (e.g., 0-15 kHz; 1-30 kHz; etc.):

TABLE 2

PUSCH preparation time for PUSCH timing capability 1

| μ | PUSCH Preparation Time N2 (symbols) |
|---|---|
| 0 | 10 |
| 1 | 12 |
| 2 | 23 |
| 3 | 36 |

TABLE 3

PUSCH preparation time for PUSCH timing capability 2.

| μ | PUSCH Preparation Time N2 (symbols) |
|---|---|
| 0 | 2.5-6 |
| 1 | 2.5-6 |
| 2 | TBD |
| 3 | TBD |

The standards body has not yet determined values for μ=2 and 3; however, one of ordinary skill in the art could determine these values through experimentation.

$N_2$ and $K_2$ are based on the numerology of the PUSCH to be transmitted;

$d_2$ is a value based on whether the first symbol of the PUSCH allocation does/does not consist only of the DM-RS, where:

$d_2=0$ if the first symbol of the PUSCH allocation consists of the DM-RS only;

$d_2=1$ if the first symbol of the PUSCH allocation does not consist of the DM-RS only;

$SD_{CHIPS}$ is the symbol duration measured in chips. For OFDM, one example could be $SD_{CHIPS}=2048$;

$CP_{LENGTH}$ is the length of the cyclic prefix. For example, the value of $CP_{LENGTH}$ is 144;

$C_{SCS}$ is numerology-dependent constant having one of the following values:

if $\mu UL < \mu DL$, $C_{SCS} = K \times 2^{-\mu DL}$;

otherwise $C_{SCS} = K \times 2^{-\mu UL}$, where K is defined as the ratio $T_S/T_C$ and equates to 64; and $T_C$ is defined as the OFDM chip duration assuming 4096 subcarriers and a subcarrier spacing of 480 kHz. That is, $T_C=1/(480e3*4096)$ seconds. $C_{SCS}*T_C$ is the OFDM chip duration of numerology μ.

$T_S$ is defined as the OFDM chip duration of LTE. That is, assuming 2048 subcarriers and a subcarrier spacing of 15 kHz, $T_S=1/(15e3*2048)$ seconds.

Figure 10:
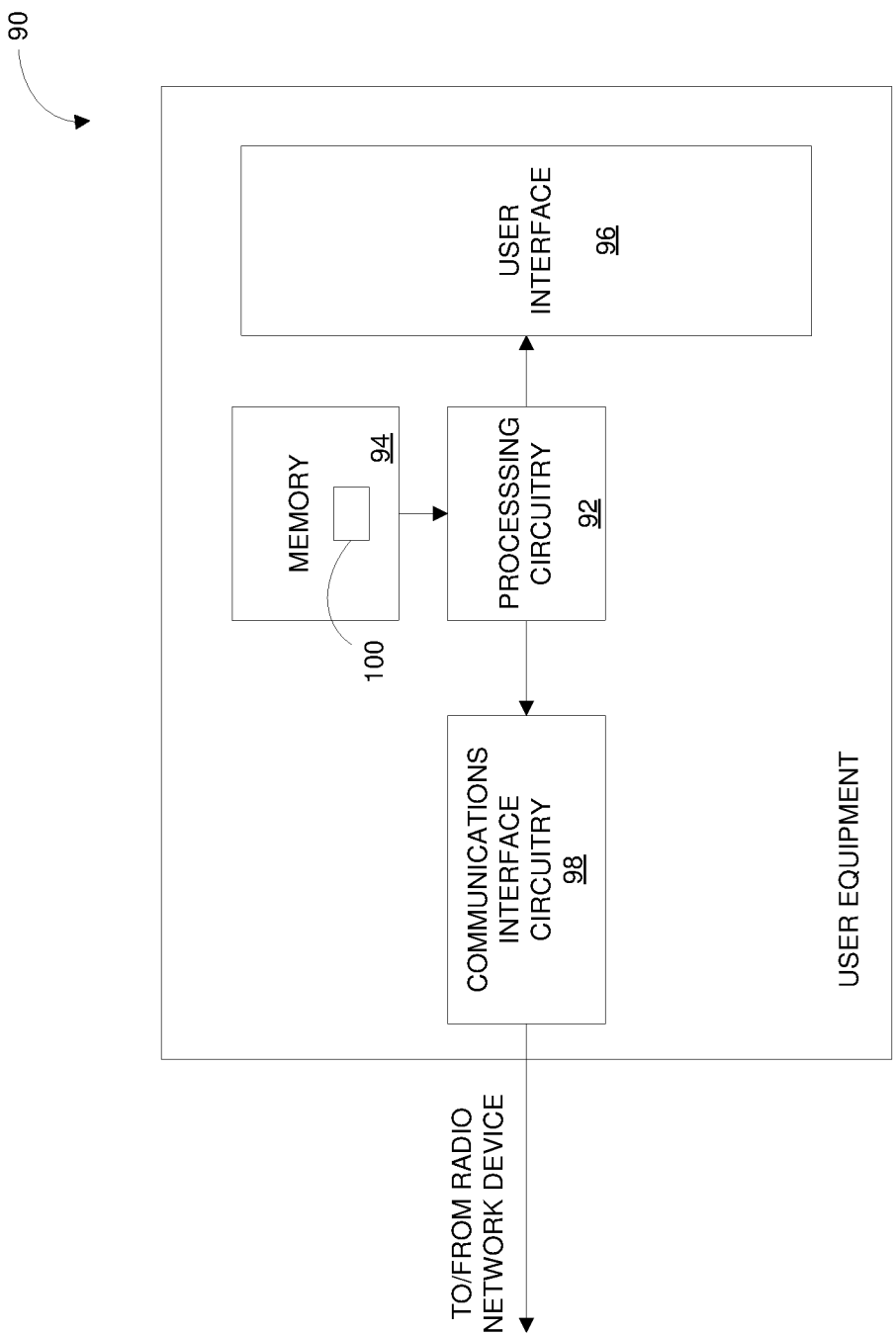
FIG. 10 is a block diagram illustrating a UE configured according to one embodiment of the present disclosure.

FIG. 10 is a functional block diagram illustrating a UE 90 configured to determine a starting symbol within an uplink slot according to embodiments of the present disclosure. As seen in FIG. 10, UE 90, which may be a cellular telephone or a "smartphone," for example, comprises processing circuitry 92, a memory 94, an optional user interface 96, and a communications interface circuitry, such as a transceiver 98, for example. Those of ordinary skill in the art will readily appreciate that UE 90 may or may not comprise other components not specifically depicted here.

The processing circuitry 92 may comprise any sequential state machine operative to execute machine instructions stored as machine-readable computer programs in memory 94, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), or any combination of the above.

Memory 94 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

User interface 96 may comprise various devices and circuits that allow a user to interact with, and control the functionality of, the UE 90. Such an interface may include, without limitation, display screens, touch-sensitive displays, keypads, control buttons, microphones, speakers, and the like.

The communications interface circuitry 98 may comprise one or more transceivers used to communicate with one or more other transceivers (e.g., base stations) via a Radio Access Network (RAN) according to one or more communication protocols known in the art or that may be developed, such as IEEE 802.xx, CDMA, WCDMA, GSM, LTE, UTRAN, WiMax, NB-IoT, NR, or the like. The communications interface circuitry 98 implements transmitter and receiver functionality appropriate to the RAN links (e.g., frequency allocations and the like). The transmitter and receiver functions may share circuit components and/or software, or alternatively may be implemented separately.

According to embodiments of the present disclosure, memory 94 is operative to store, and the processing circuitry 92 operative to execute, software 100. The software 100, when executed by the processing circuitry 92, may be operative to cause UE 90 to autonomously determine a starting symbol within an uplink slot for a scheduled uplink transmission to a base station, and to transmit the scheduled uplink transmission to the base station from the starting symbol.

Figure 11:
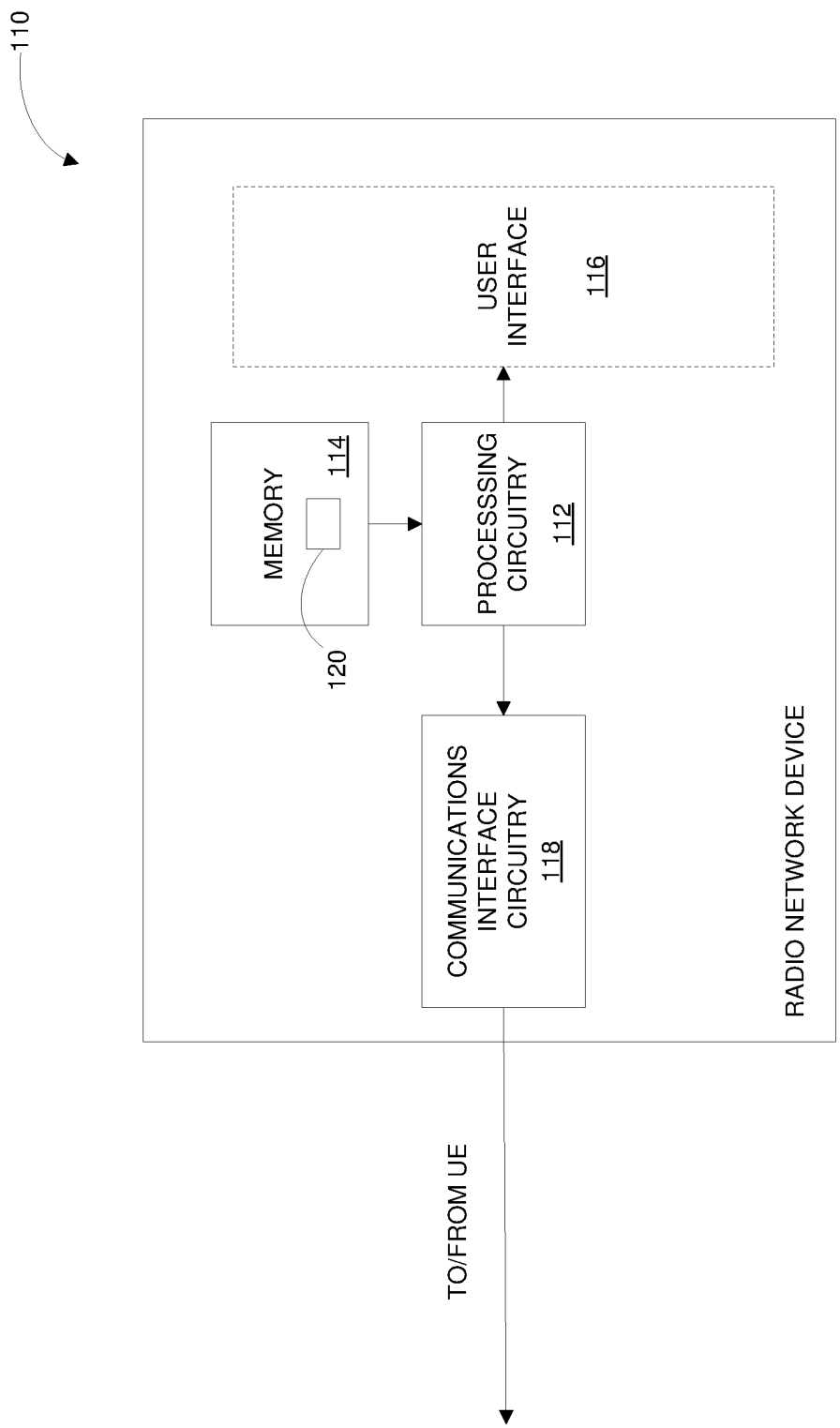
FIG. 11 is a block diagram illustrating a radio network node configured according to one embodiment of the present disclosure.

FIG. 11 is a functional block diagram illustrating a radio network node 110 configured to determine a starting symbol within an uplink slot according to embodiments of the present disclosure. As seen in FIG. 11, radio network node 110 is any type device capable of communicating with a UE. A radio network node 110 in some embodiments may therefore refer, for example, to a base station or an access point. In other embodiments, however, the radio network node 110 may refer to a UE (e.g., a smartphone) in a device-to-device (D2D) embodiment, a machine-to-machine (M2M) device, a machine-type communications (MTC) device, a Narrowband Internet of Things (NB IoT) device, or more generally, an initiator node configured to transmit in a downlink slot and receive in an uplink slot, and a responder node configured to transmit in an uplink slot and receive in a downlink slot, and the like. Regardless of the particular embodiment, however, radio network node 100 comprises processing circuitry 112, a memory 114, an optional user interface 116, and a communications interface circuitry 118, such as a transceiver, for example. Those of ordinary skill in the art will readily appreciate that radio network node 110 may or may not comprise other components not specifically depicted here.

The processing circuitry 112 may comprise any sequential state machine operative to execute machine instructions stored as machine-readable computer programs in memory 114, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), or any combination of the above.

Memory 114 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

User interface 116 is optional. However, when present, user interface 116 may comprise various devices and circuits that allow a user to interact with, and control the functionality of, the radio network node 110. Such an interface may include, without limitation, display screens, touch-sensitive displays, keypads, keyboards, control buttons, microphones, speakers, and the like.

The communications interface circuitry 118 may comprise one or more transceivers used to communicate with one or more other transceivers (e.g., base stations) via a Radio Access Network (RAN) according to one or more communication protocols known in the art or that may be developed, such as IEEE 802.xx, CDMA, WCDMA, GSM, LTE, UTRAN, WiMax, NB-IoT, NR, or the like. The communications interface circuitry 118 implements transmitter and receiver functionality appropriate to the RAN links (e.g., frequency allocations and the like). The transmitter and receiver functions may share circuitry components and/or software, or alternatively may be implemented separately.

According to embodiments of the present disclosure, memory 114 is operative to store, and the processing circuitry 112 operative to execute, software 120. In one embodiment, software 120, when executed by the processing circuitry 112, is operative to cause the processing circuitry 112 to receive a scheduled uplink transmission from a UE comprising one or more symbols, and determine, based on demodulating and decoding the scheduled uplink transmission, which of the one or more symbols is a starting symbol for the scheduled uplink transmission.

In another embodiment, the software 120, when executed by the processing circuitry 112, is operative to cause the processing circuitry 112 to select a starting symbol within an uplink slot for a scheduled uplink transmission by a UE, and identify the starting symbol to the UE.

Figure 12:
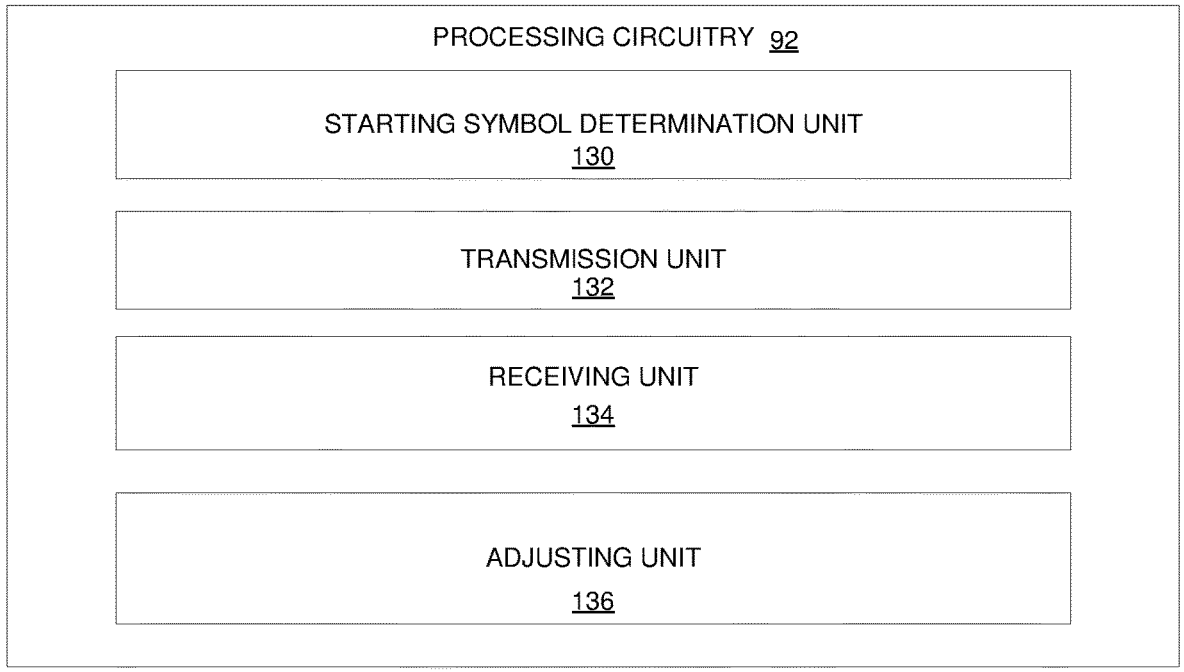
FIG. 12 is a diagram of physical units in processing circuitry in the UE according to one embodiment of the present disclosure.

FIG. 12 illustrates example processing circuitry 92, such as that in UE 90 of FIG. 10. The processing circuitry 92 comprises one or more physical units. In particular, processing circuitry 92 can comprise a starting symbol determination unit 130, a transmission unit 132, a receiving unit 134, and an adjusting unit 136. The starting symbol determination unit 130 is configured to autonomously determine a starting symbol within an uplink slot for a scheduled uplink transmission to a radio network node, such as a base station. The transmission unit 132 is configured to transmit the scheduled uplink transmission to the radio network node from the starting symbol. The receiving unit 134 is configured to receive a nominal or actual starting position within the uplink slot in cases where the radio network node provides the starting position to the UE 90. Because, in some embodiments, the starting position provided by the radio network node may not be the actual starting position, the adjusting unit 136 is configured to adjust the nominal starting position received from the radio network node to determine an actual starting position within the uplink slot for the scheduled uplink transmission. The adjusting unit 136 may adjust the nominal starting position based on at least one of a predetermined control region size, a predetermined Downlink Control Information (DCI) position, and a predetermined end position associated with a previous downlink transmission, wherein the predetermined end position defines one of a downlink slot that corresponds to the uplink slot and a downlink slot that occurs prior to the uplink slot.

Those of ordinary skill in the art will readily appreciate that the adjusting unit 136 is not required in cases where the starting position provided by the radio network node is the actual starting position. In such cases, the processing circuitry 92 may not utilize the adjusting unit 136, if this unit exists, or alternatively, may not include this unit at all.

Figure 13:
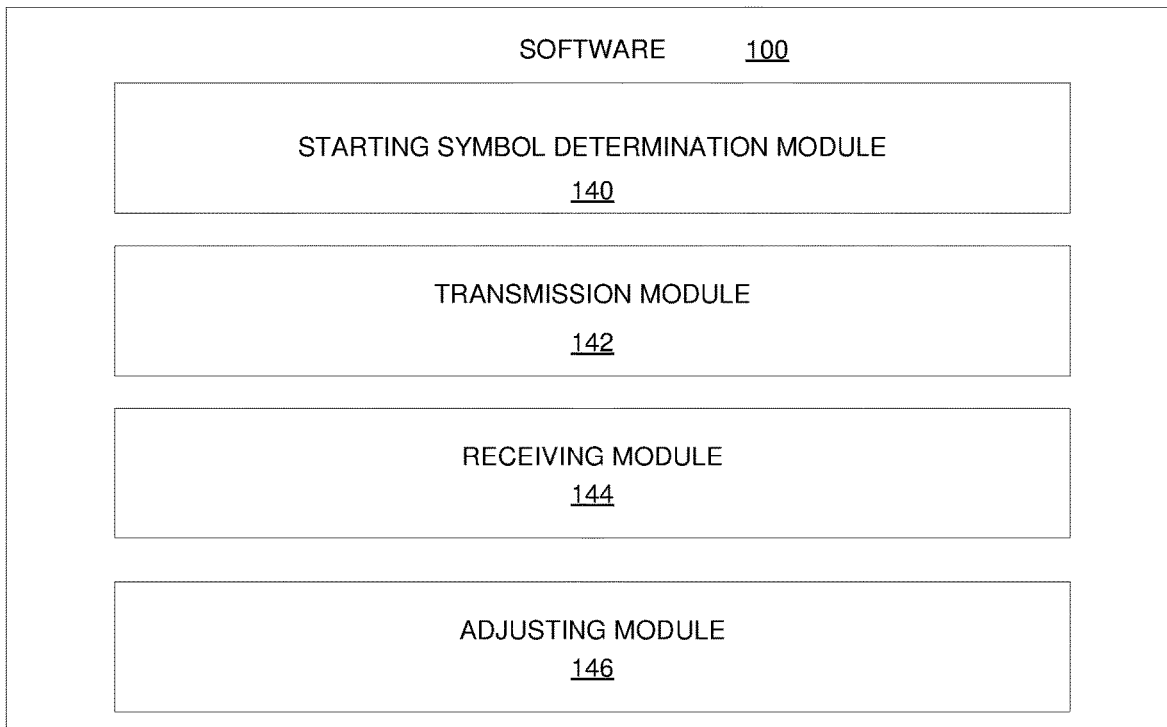
FIG. 13 is a diagram of software modules in memory in the UE according to one embodiment of the present disclosure.

FIG. 13 illustrates example software 100, such as that in memory 94 of FIG. 10. The software 100 comprises a plurality of software modules. In particular, the software 100 can comprise a starting symbol determination module 140, a transmission module 142, a receiving module 144, and an adjusting module 146. The starting symbol determination module 140 is configured to autonomously determine a starting symbol within an uplink slot for a scheduled uplink transmission to a base station. The transmission module 142 is configured to transmit the scheduled uplink transmission to the base station from the starting symbol. The receiving module 144 is configured to receive the nominal, or actual, starting position within the uplink slot in cases where the radio network node provides the starting position to the UE 90. Because, in some embodiments, the starting position provided by the radio network node may not be the actual starting position, the adjusting module 146 is configured to adjust the nominal starting position received from the radio network node to determine an actual starting position within the uplink slot for the scheduled uplink transmission. The adjusting module 146 may adjust the nominal starting position based on at least one of a predetermined control region size, a predetermined Downlink Control Information (DCI) position, and a predetermined end position associated with a previous downlink transmission, wherein the predetermined end position defines one of a downlink slot that corresponds to the uplink slot and a downlink slot that occurs prior to the uplink slot.

Similar to above, the adjusting module 146 is not required in cases where the starting position provided by the radio network node is the actual starting position. In such cases, the software 100 may not call the adjusting module 146, if this module exists, or alternatively, may not include this module at all.

Figure 14:
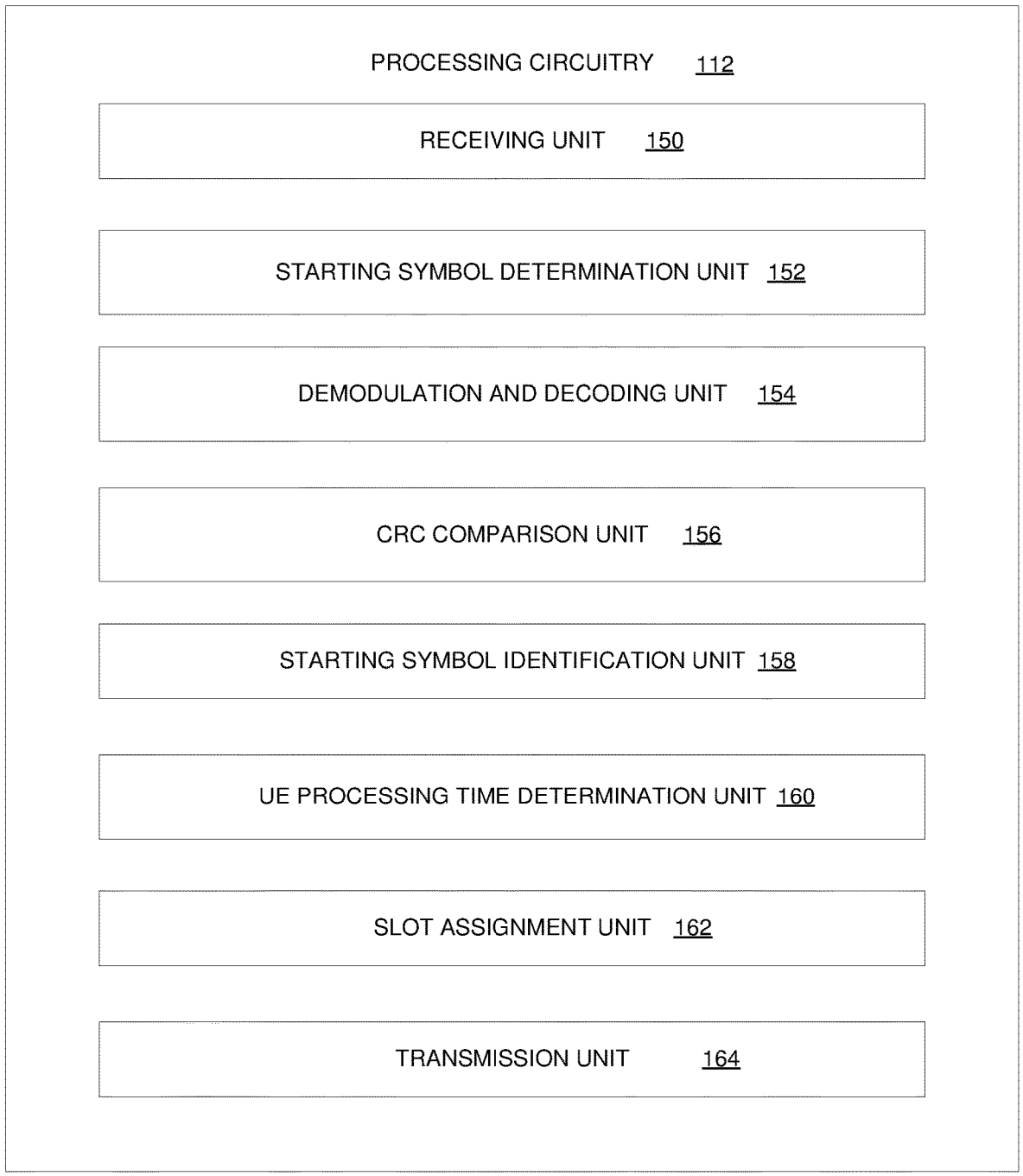
FIG. 14 is a diagram of physical units in processing circuitry in the radio network node according to one embodiment of the present disclosure.

FIG. 14 illustrates example processing circuitry 112, such as that in radio network node 110 of FIG. 11. The processing circuitry 112 comprises a plurality of physical units. In particular, processing circuitry 112 comprises a receiving unit 150, a starting symbol determination unit 152, a demodulation and decoding unit 154, a CRC comparison unit 156, a starting symbol identification unit 158, a UE processing time determination unit 160, a slot assignment unit 162, and a transmission unit 164.

The receiving unit 150 is configured to receive, from a UE such as UE 90, a scheduled uplink transmission comprising one or more symbols. The starting symbol determination unit 152 is configured to determine which of the one or more symbols is a starting symbol for the scheduled uplink transmission. In particular, the starting symbol determination unit 152 is configured to select different symbols from the one or more symbols as the starting symbol. The demodulation and decoding unit 154 is configured to demodulate and decode the scheduled uplink transmission, using the selected symbol. The CRC comparison unit 156 is configured to compare a CRC value associated with the decoded scheduled uplink transmission to a CRC value included in the scheduled uplink transmission. The starting symbol identification unit 158 is configured to identify the selected symbol as the starting symbol responsive to the CRC comparison unit 156 indicating that the CRC value associated with the decoded scheduled uplink transmission matches the CRC value included in the scheduled uplink transmission, and/or select the starting symbol based on a current understanding of how much time the UE 90 needs to decode the DCI and prepare the scheduled uplink transmission based on the decoded DCI. The UE processing time determination unit 160 is configured to determining the processing time needed by the UE to decode the DCI and prepare the scheduled uplink transmission based on the decoded DCI. The slot assignment unit 162 is configured to identify a slot assignment in the DCI that is transmitted to the UE. The transmission unit 164 is configured to transmit one or both of the slot assignment and the starting symbol, together or separately, to the UE.

Figure 15:
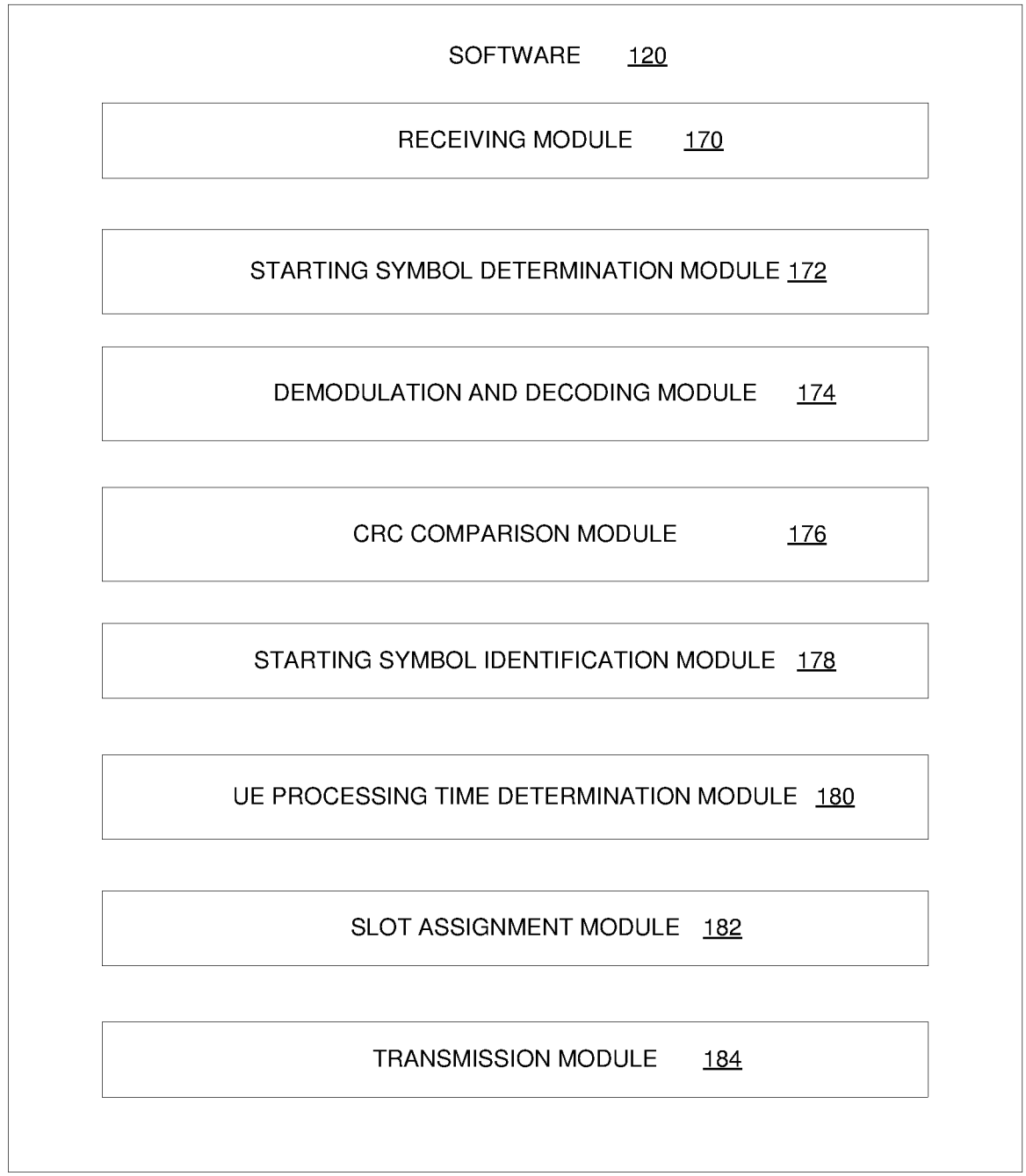
FIG. 15 is a diagram of software modules in memory in the radio network node according to one embodiment of the present disclosure.

FIG. 15 illustrates example software 120, such as that stored in memory 114 of radio network node 110 in FIG. 11. The software 120 comprises a plurality of software modules. In particular, software 120 comprises a receiving module 170, a starting symbol determination module 172, a demodulation and decoding module 174, a CRC comparison module 176, a starting symbol identification module 178, a UE processing time determination module 180, a slot assignment module 182, and a transmission module 184.

The receiving module 170 is configured to receive, from a UE such as UE 90, a scheduled uplink transmission comprising one or more symbols. The starting symbol determination module 172 is configured to determine which of the one or more symbols is a starting symbol for the scheduled uplink transmission. In particular, the starting symbol determination module 172 is configured to select different symbols from the one or more symbols as the starting symbol. The demodulation and decoding module 174 is configured to demodulate and decode the scheduled uplink transmission, using the selected symbol. The CRC comparison module 176 is configured to compare a CRC value associated with the decoded scheduled uplink transmission to a CRC value included in the scheduled uplink transmission. The starting symbol identification module 178 is configured to identify the selected symbol as the starting symbol responsive to the CRC comparison module 176 indicating that the CRC value associated with the decoded scheduled uplink transmission matches the CRC value included in the scheduled uplink transmission, and/or select the starting symbol based on a current understanding of how much time the UE 90 needs to decode the DCI and prepare the scheduled uplink transmission based on the decoded DCI. The UE processing time determination module 180 is configured to determine the processing time needed by the UE to decode the DCI and prepare the scheduled uplink transmission based on the decoded DCI. The slot assignment module 182 is configured to identify a slot assignment in the DCI that is transmitted to the UE. The transmission module 184 is configured to transmit one or both of the slot assignment and the starting symbol, together or separately, to the UE 90.

Embodiments of the present disclosure present numerous advantages over the prior art. For example, one advantage is that the network and the UE will have a common, accurate understanding of the starting position for uplink transmissions.

The present disclosure may, of course, be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

What is claimed is:

1. A method, implemented at a User Equipment, UE, of determining when, within an uplink slot, to begin an uplink transmission, the method comprising:
   receiving, from a radio network node, a message identifying a starting symbol together with an uplink slot assignment for the starting symbol for a scheduled uplink transmission, wherein the message identifies the starting symbol to the UE as a nominal starting position; and
   transmitting the scheduled uplink transmission to the radio network node in the assigned uplink slot from the starting symbol.

2. The method of claim 1 wherein the message identifying the starting symbol within the assigned uplink slot for the scheduled uplink transmission comprises one of:
   a scheduling grant transmitted to the UE; and
   a Radio Resource Control, RRC, signaling message.

3. A User Equipment, UE, comprising:
   a transceiver configured to communicate data with a radio network node in a communications network; and
   processing circuitry operatively connected to the transceiver and configured to:
      receive, from a radio network node, a message identifying a starting symbol together with an uplink slot assignment for the starting symbol for a scheduled uplink transmission, wherein the message identifies the starting symbol to the UE as a nominal starting position; and
      transmit the scheduled uplink transmission to the radio network node in the assigned uplink slot from the starting symbol.

4. The UE of claim 3 wherein the message identifying the starting symbol within the assigned uplink slot for the scheduled uplink transmission comprises one of:
   a scheduling grant transmitted to the UE; and
   a Radio Resource Control, RRC, signaling message.

5. A method, implemented at a radio network node, of determining a starting symbol and slot assignment for a scheduled uplink transmission by User Equipment, UE, the method comprising:
   selecting a starting symbol together with an uplink slot assignment for the starting symbol for a scheduled uplink transmission by a UE; and
   identifying the starting symbol and slot assignment for the starting symbol to the UE, wherein identifying the starting symbol to the UE comprises identifying a nominal starting position to the UE.

6. The method of claim 5 wherein selecting the starting symbol comprises selecting the starting symbol based on at least one of:
- a length of a downlink, DL, control region;
- a position of PDCCH within a DL control region;
- a processing time needed by the UE to decode Downlink Control Information, DCI, and to prepare the scheduled uplink transmission based on the decoded DCI; and
- an amount of time alignment provided to the UE.

7. The method of claim 6 further comprising determining the processing time needed by the UE, wherein determining the processing time comprises adjusting the processing time based on a characteristic of one or more of a Physical Uplink Shared Channel, PUSCH, Physical Downlink Shared Channel, PDSCH, and a Physical Downlink Control Channel, PDCCH, depending on an Orthogonal Frequency Division Multiplex, OFDM, symbol duration.

8. The method of claim 5 wherein identifying the starting symbol to the UE comprises identifying the starting symbol in one of:
- a scheduling grant transmitted to the UE; and
- a Radio Resource Control, RRC, signaling message transmitted to the UE.

9. The method of claim 5, further comprising identifying the starting symbol to the UE together with the slot assignment.

10. The method of claim 5, further comprising identifying the starting symbol to the UE separately from the slot assignment.

11. The method of claim 10 wherein identifying the starting symbol separately from the slot assignment comprises:
- identifying the slot assignment in the DCI transmitted to the UE; and
- identifying the starting symbol in an RRC signaling message transmitted to the UE.

12. The method of claim 5, wherein identifying the starting symbol to the UE comprises identifying a starting position within the assigned uplink slot based on one or more of:
- a predetermined control region size;
- a predetermined PDCCH position; and
- a predetermined end position associated with a previous downlink transmission, wherein the predetermined end position defines one of a downlink slot that corresponds to the uplink slot and a downlink slot that occurs prior to the uplink slot.

13. The method of claim 5, wherein the uplink slot is comprised in a first part of a slot, and wherein a second part of the slot comprises a downlink slot.

14. A radio network node comprising:
- a transceiver configured to communicate data with a User Equipment (UE); and
- processing circuitry operatively connected to the transceiver and configured to:
  - select a starting symbol together with an uplink slot assignment for the starting symbol for a scheduled uplink transmission by the UE; and
  - identify the starting symbol and slot assignment to the UE via the transceiver, wherein the processing circuitry is configured to identify an actual starting position within the assigned uplink slot to the UE.

15. The radio network node of claim 14 wherein the processing circuitry is configured to select the starting symbol based on at least one of:
- a length of a downlink, DL, control region;
- a position of PDCCH within the DL control region
- a processing time needed by the UE to decode Downlink Control Information, DCI, and to prepare the scheduled uplink transmission based on the decoded DCI; and
- an amount of time alignment applied by the UE.

16. The radio network node of claim 15 wherein the processing circuitry is configured to determine the processing time needed by the UE by adjusting the processing time based on a characteristic of one or more of a Physical Uplink Shared Channel, PUSCH, a Physical Downlink Shared Channel, PDSCH, and a Physical Downlink Control Channel, PDCCH, depending on an Orthogonal Frequency Division Multiplex, OFDM, symbol duration.

17. The radio network node of claim 14, wherein the processing circuitry is configured to identify the starting symbol in at least one of:
- a scheduling grant transmitted to the UE; and
- a Radio Resource Control, RRC, signaling message transmitted to the UE;
- circuitry is further configured to identify a slot assignment for the starting symbol to the UE.

18. The radio network node of claim 14, wherein the processing circuitry is configured to identify the starting symbol together with the slot assignment.

19. The radio network node of claim 14, wherein the processing circuitry is configured to identify the starting symbol separately from the slot assignment.

20. The radio network node of claim 19 wherein, to identify the starting symbol separately from the slot assignment, the processing circuitry is configured to:
- identify the slot assignment in the DCI transmitted to the UE; and
- identify the starting symbol in an RRC signaling message transmitted to the UE.

21. The radio network node of claim 14, wherein the processing circuitry is configured to identify a starting symbol for the UE to use based on one or more of:
- a predetermined control region size;
- a predetermined PDCCH position; and
- a predetermined end position associated with a previous downlink transmission, wherein the predetermined end position defines one of a downlink slot that corresponds to the uplink slot and a downlink slot that occurs prior to the uplink slot.

22. The radio network node of claim 14, wherein the uplink slot is comprised in a first part of a slot, and wherein a second part of the slot comprises a downlink slot.

* * * * *